(12) United States Patent
Sakai et al.

(10) Patent No.: US 7,444,024 B2
(45) Date of Patent: Oct. 28, 2008

(54) IMAGE COMPRESSION METHOD

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 10/971,119

(22) Filed: Oct. 25, 2004

(65) Prior Publication Data

US 2005/0238240 A1 Oct. 27, 2005

(30) Foreign Application Priority Data

Apr. 26, 2004 (JP) ............................. 2004-130161

(51) Int. Cl.
G06K 9/36 (2006.01)

(52) U.S. Cl. ....................................... 382/232; 382/318

(58) Field of Classification Search ................. 382/232, 382/318, 319, 239, 272, 270, 245, 246; 358/474, 358/448, 483, 497, 461, 494; 372/24, 50.12, 372/50.13; 348/316; 356/75; 399/211
See application file for complete search history.

(56) References Cited

U.S. PATENT DOCUMENTS

| | | | | |
|---|---|---|---|---|
| 5,274,470 A | * | 12/1993 | Karita et al. | ................. 358/448 |
| 5,777,749 A | * | 7/1998 | Noda et al. | ................. 382/239 |
| 5,920,655 A | * | 7/1999 | Makita et al. | ............... 382/272 |
| 2003/0123087 A1 | | 7/2003 | Sakai et al. | ................. 358/1.9 |

FOREIGN PATENT DOCUMENTS

| | | |
|---|---|---|
| JP | 09-055858 A | 2/1997 |
| JP | 2000-152234 A | 5/2000 |
| JP | 2003-189108 | 7/2003 |
| JP | 2003-198855 A | 7/2003 |
| JP | 2003-198856 | 7/2003 |

OTHER PUBLICATIONS

Japanese Office Action dated May 15, 2007 (mailing date), issued in corresponding Japanese Patent Application No. 2004-130161.

* cited by examiner

*Primary Examiner*—Anh Hong Do
(74) *Attorney, Agent, or Firm*—Westerman, Hattori, Daniels & Adrian, LLP.

(57) ABSTRACT

To provide a technology of increasing coding efficiency for an isolated column which appears with a high frequency. Bit map data which indicates an image by an array of pixels of main scanning and subscanning directions is scanned in the main scanning direction, the data is separated into an area including a black pixel and an area including no black pixel by units of a predetermined number of logical lines based on a result of the main scanning, the area including the black pixel which has been separated in the first area separation step is scanned in the subscanning direction, the data is separated into a coded area coincident with a predetermined coded pattern and a noncoded area noncoincident with the coded pattern, an isolated column coincident with a predetermined isolated pattern is separated from the noncoded area separated, and the areas are coded by combining a code indicating the isolated column with a code indicating the number of columns of an area adjacent to the isolated column when the areas separated are coded as elements.

25 Claims, 15 Drawing Sheets

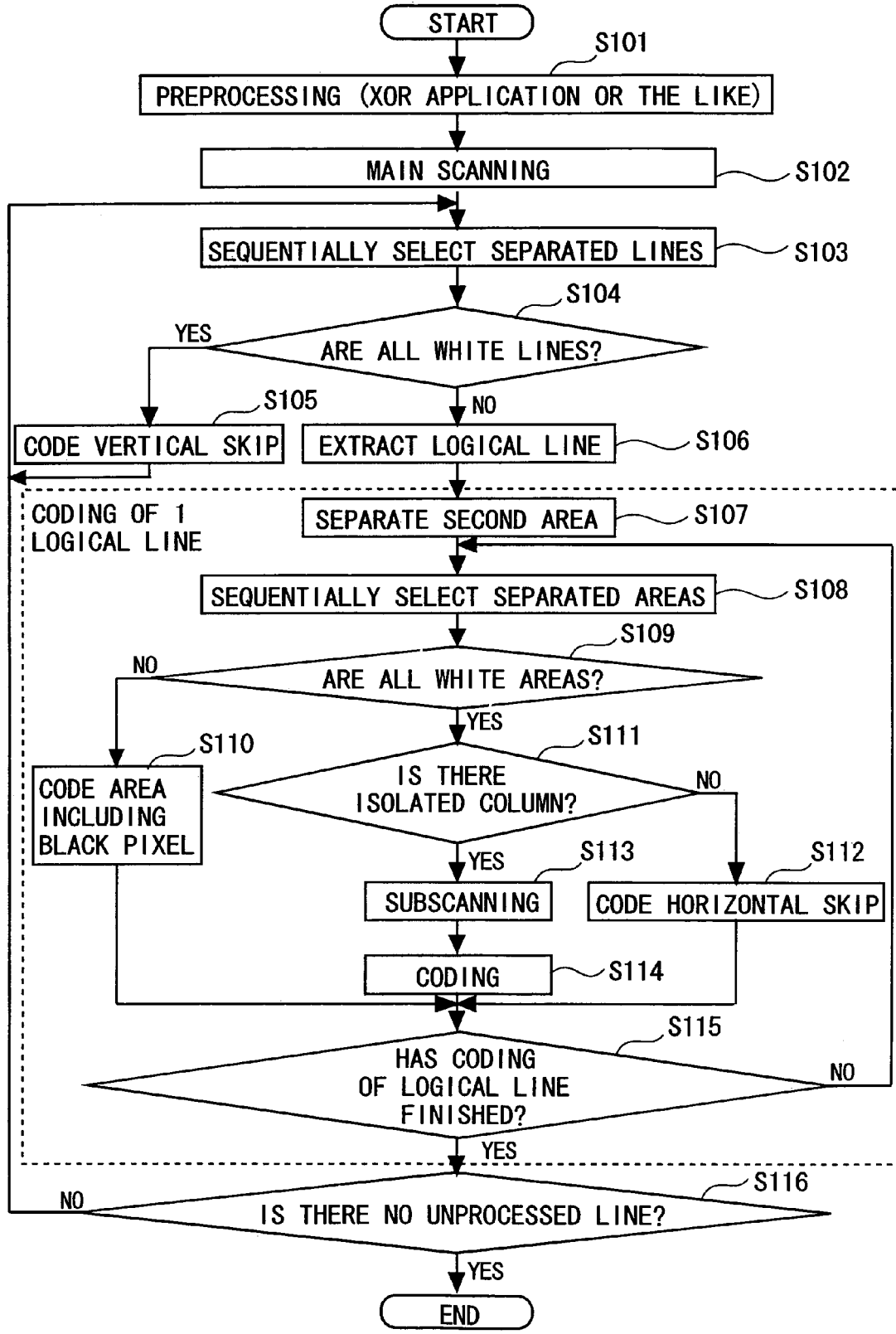

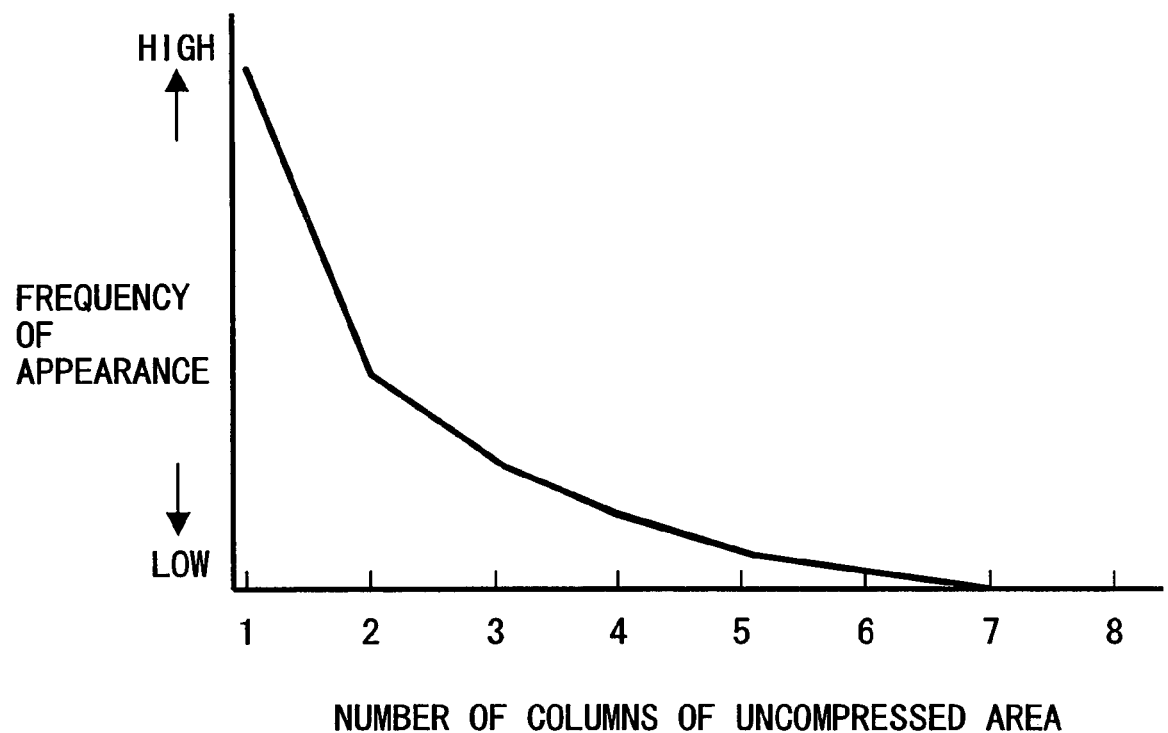

CODE-An

CODE-Bv

*CODE-A, CODE-B, n1 TO n5, v1 TO v5 ARE CODED BY 1 BYTE

*CODE-C, n1 TO n5, v2 TO v5 ARE CODED BY 1 BYTE

CODE IDENTIFIER D(8BIT)  NUMBER OF REPETITIVE TIMES(8BIT)

CODE-DR

HORIZONTAL SKIP LENGTH n(8BIT)  PIXEL VALUE OF ISOLATED COLUMN v(8BIT)

(n, v)

CODE-DR(n1, v1), (n2, v2), (n3, v3), (n4, v4), (n5, v5) → CODE SIZE =12 BYTES

*CODE-D, R, n1 TO n5, v1 TO v5 ARE CODED BY 1 BYTE, R IS NUMBER OF REPETITIVE TIMES (5 IN THIS EXAMPLE)

IMAGE COMPRESSION METHOD

BACKGROUND OF THE INVENTION

The present invention relates to a technology of compressing image data. For example, the invention relates to a technology which enables shortening of a transfer time and simplification of a printer by compressing and transferring bit map data of a document to the printer when the document on a computer is printed and output by the printer.

As a conventional compression method of bit map images, there have been available Modified Huffman (MH), Modified READ (MR), Modified Modified READ (MMR), Joint Bi-Level Image Experts Group (JBIG), and the like, which have been widely used in FAX communication and image filing.

These compression methods are not suited to high-speed coding because it quite often uses bit processing. Thus, there have been presented a compression method and a compression device of bitmap data designed to achieve high-speed processing (Patent document 1).

According to the image compression method, as shown in FIG. 20(A), an input image 142 is scanned in a horizontal direction to separate an area 146 which includes a black pixel. The separated area is scanned in a vertical direction as shown in FIG. 20(B) to be separated into areas 152-1 to 152-3 which include black pixels.

An area 144-1 that includes no black pixel shown in FIG. 20(A) is coded as a skip 148 in the vertical direction, and areas 150-1, 150-2 that include no black pixels shown in FIG. 20(B) are coded as skips 151-1, 151-2 in the horizontal direction.

In the separated areas 152-1 to 152-3 that include the black pixels, identical column patterns 154 in which columns having equal pixel values continue are coded based on column pixel values and the number of repetitive times. The other column patterns are regarded as uncompressed areas, and pixel values thereof are directly coded and output.

Further, to increase compression ratios of the separated areas 152-1 to 152-3 which include the black pixels shown in FIG. 20(B), there have been presented a method of compressing a stepped pattern 156 in which column pixel values change in step fashion (Patent document 2), a method of compressing a repetitive pattern 158 in which patterns of certain columns and widths appear continuously and repeatedly (Patent document 3), and a method of compressing identical patterns which discretely appear (Patent document 4). Areas left after application of the image compression methods are directly coded and output as uncompressed areas 157-1 to 157-4 which cannot be compressed by adding type codeword indicating incompressibility to pixel values thereof.

[Patent document 1] Japanese Patent No. 3278298
[Patent document 2] Japanese Patent Application Laid-Open No. 2003-198855
[Patent document 3] Japanese Patent Application Laid-Open No. 2003-189108
[Patent document 4] Japanese Patent Application Laid-Open No. 2003-198856

SUMMARY OF THE INVENTION

However, according to the conventional image coding method, when the uncompressed area that cannot be compressed is coded and output, the need to add the codeword indicating incompressibility for separation from other codes has caused an increase in the amount of data exceeding an original data size. For example, assuming that image data of an uncompressed area is N bytes and a codeword is 1 byte, the code data of the uncompressed area increases to N+1 bytes while the original data is N bytes.

Furthermore, for the uncompressed areas, there is a tendency that generally a frequency of appearance is higher in the case of an area of a smaller number of columns (shorter width) and a frequency of appearance is lowered more as the number of columns increases while a frequency of appearance is highest in the case of an area of 1 column. That is, an uncompressed area of about 1 column exists in isolation from a compressible area with a relatively high frequency. The column existing in isolation (isolated column) has caused a drop in coding efficiency since the addition of the codeword doubles the code size in the case of, e.g., the area of 1 column which has a highest frequency of appearance.

It is therefore an object of the present invention to provide a technology of increasing coding efficiency for an isolated column which appears with a high frequency.

To solve the foregoing problems, the invention employs the following means. That is, an image compression method executed by a computer includes:

a main scanning step of scanning bit map data which indicates an image by an array of pixels of main scanning and subscanning directions in the main scanning direction;

a first area separation step of separating the data into an area including a black pixel and an area including no black pixel by units of a predetermined number of logical lines based on a result of the main scanning;

a subscanning step of scanning the area including the black pixel which has been separated in the first area separation step in the subscanning direction;

a second area separation step of separating the data into a coded area coincident with a predetermined coded pattern and a noncoded area noncoincident with the coded pattern;

a third area separation step of separating an isolated column coincident with a predetermined isolated pattern from the noncoded area separated in the second area separation step; and a coding step of coding the areas by combining a code indicating the isolated column with a code indicating the number of columns of an area adjacent to the isolated column when the areas separated in the first to third area separation steps are coded as elements.

An image compression device of the invention includes:

a first area separation section which scans bit map data indicating an image by an array of pixels of main scanning and subscanning directions in the main scanning direction to separate the data into an area including a black pixel and an area including no black pixel by units of a predetermined number of lines;

a second area separation section which scans the area including the black pixel which has been separated in the first area separation section in the subscanning direction to separate the area into a coded area coincident with a predetermined coded pattern and a noncoded area non coincident with the coded pattern;

a third area separation section which separates an isolated column coincident with a predetermined isolated pattern from the noncoded area separated in the second area separation section; and a coding section which codes the areas by combining a code indicating the isolated column with a code indicating the number of columns of an area adjacent to the isolated column when the areas separated in the first to third area separation sections are coded as elements.

Thus, according to the invention, the image is scanned in the main scanning (horizontal) direction to be separated into the area including the black pixel and the area including no black pixel. The area including the black pixel is further scanned in the subscanning (vertical) direction to be separated into the coded area and the noncoded area. When the separated areas are coded as the elements, by paying attention to characteristics that for areas left as uncompressed areas, a frequency of appearance is higher as the number of columns is smaller and an area of about 1 column (isolated pattern) appears with a high frequency, the isolated column is separated from the uncompressed area, and a code is allocated thereto in combination with the adjacent area. Accordingly, no increase occurs in the amount of data even when the short isolated column is coded, and a compression ratio is increased.

Incidentally, in the image compression method and the image compression device, the number of columns of the isolated pattern may be 1, all the lines may be black pixels or specific lines may be black pixels, and the area adjacent to the isolated column may be an area which includes no black pixel.

When the isolated column repeatedly appears, in addition to the code indicating the isolated column and the code indicating the number of columns of the area adjacent to the isolated area, a code indicating the number of repetitive times of the isolated column may be combined to execute the coding.

Thus, by executing the coding in combination with the code indicating the number of repetitive times of the isolated column, when "HORIZONTAL SKIP+ISOLATED COLUMN" is repeated by at least 3 times or more even in consideration of a code length allocated to the number of repetitive times, a code size becomes smaller compared with the case of not combining the number of repetitive times.

Additionally, when the isolated column is separated, an isolated column including only 1 black pixel therein may be selectively separated. When the coding is executed, an existent position of the black pixel in the column may be used as a code indicating the isolated column.

A pixel value itself can be used as the code indicating the isolated column. However, the code size can be made much smaller by using a code which limits its target to an isolated column of a high frequency of appearance. For example, when the number of logical lines is 8, 8 bits are necessary if a pixel value itself is used as a code of an isolated column. However, by specifying an isolated column which includes 1 black pixel, the coding can be executed by a 3-bit numerical value since there are 8 black pixel positions as shown in FIG. 14.

Further, when the isolated column is separated, an isolated column that includes only N (N is an integer of 1 or more) continuous black pixels may be selectively separated. When the coding is executed, existent positions of the black pixels and the number of black pixels in the column may be used as a code indicating the isolated column.

Thus, for example, when the number of logical lines is 8, since the maximum number of black pixel positions is 8 and the number of included black pixels is 1 to 8 as shown in FIG. 15, 3 bits are allocated to each to enable the coding by totally 6 bits.

At this time, the number of code bits can be made much smaller by reducing the maximum number of target black pixels. For example, by limiting a target to an isolated column which includes a maximum of 4 continuous black pixels, bits allocated to a code of the number of black pixels are only 2. Thus, adding this number to the 3 bits of the code indicating the black pixel, the coding can be executed by totally 5 bits.

When the isolated column is separated, an isolated column having a pixel value coincident with a predetermined isolated pattern may be selectively separated. When the coding is executed, a number allocated beforehand to the isolated pattern may be used as a code indicating the isolated column.

Accordingly, a pattern of a high frequency of appearance is selected from pixel patterns in the isolated column, a pattern number is added to each pattern to uniquely identify the same, and the pattern number is used for a code. For example, when 32 patterns of high frequencies of appearance are selected, the coding can be executed by a 5-bit numerical value as a pattern number.

Furthermore, an image decoding method of the invention executed by a computer includes:

a command receiving step of receiving a decompression command of image data compressed by the image compression method;

a first decoding step of decoding a code contained in the compressed image data to be a coded area coincident with a corresponding coded pattern;

a second decoding step of decoding the data to be an isolated column and an area adjacent to the isolated column based on a code indicating inclusion of the isolated column among codes contained in the compressed image data, a third decoding step of identifying a noncoded area in the compressed image data; and a synthesizing step of obtaining pixel arrays by logical line units while the areas obtained in the first to third steps are used as elements, and synthesizing the pixel arrays obtained by the logical lines to obtain bit map data.

Furthermore, an image decoder of the invention includes:

a command receiving section which receives a decompression command of image data compressed by the image compression method;

a first decoding section which decodes a code contained in the compressed image data to be a coded area coincident with a corresponding coded pattern;

a second decoding section which decodes the data to be an isolated column and an area adjacent to the isolated column based on a code indicating inclusion of the isolated column among codes contained in the compressed image data, a third decoding section which identifies a noncoded area in the compressed image data; and a synthesizing section which obtains pixel arrays by logical line units while the areas obtained in the first to third steps are used as elements, and synthesizes the pixel arrays obtained by the logical lines to obtain bit map data.

Furthermore, a printer of the invention includes:

a data receiving section which receives image data compressed by the image compression method;

a first decoding section which decodes a code contained in the compressed image data to be a coded area coincident with a corresponding coded pattern;

a second decoding section which decodes the data to be an isolated column and an area adjacent to the isolated column based on a code indicating inclusion of the isolated column among codes contained in the compressed image data, a third decoding section which identifies a noncoded area in the compressed image data;

a synthesizing section which obtains pixel arrays by logical line units while the areas obtained in the first to third steps are used as elements, and synthesizes the pixel arrays obtained by the logical lines to obtain bit map data; and a printing section which prints and outputs the image based on the bit map data.

Additionally, the invention may be an image decoding program which causes a computer to execute the image decoding method or a recording medium in which the image decoding program is recorded to be read by the computer.

Then, by causing the computer to read and execute the program from the recording medium, a function thereof can be provided.

In this case, the computer readable recording medium means a recording medium which stores information such as data or a program electrically, magnetically, optically, mechanically or chemically and enables reading thereof by the computer. Those of the recording media which can be removed from the computer include, e.g., a flexible disk, a magneto-optical disk, a CD-ROM, a CD-R/W, a DVD, a DAT, an 8 mm tape, and a memory card.

Additionally, as recording media fixed to the computer, there are a hard disk drive, a Read-Only-Memory (ROM), and the like.

According to invention, it is possible to provide the technology which can increase the coding efficiency of the isolated column of a high frequency of appearance.

DESCRIPTION OF THE DRAWINGS

FIG. 6 is an explanatory diagram of compression processing.
FIG. 7 is a diagram showing a general tendency of the number of columns and a frequency of appearance of an uncompressed area.
FIGS. 20A and 12B are explanatory diagrams of conventional coding.

DETAILED DESCRIPTION OF THE INVENTION

Hereinafter, the best mode of the present invention will be described with reference to the accompanying drawings. Embodiments below are illustrative but not limitative of the invention.

<Device Constitution>

Figure 1:
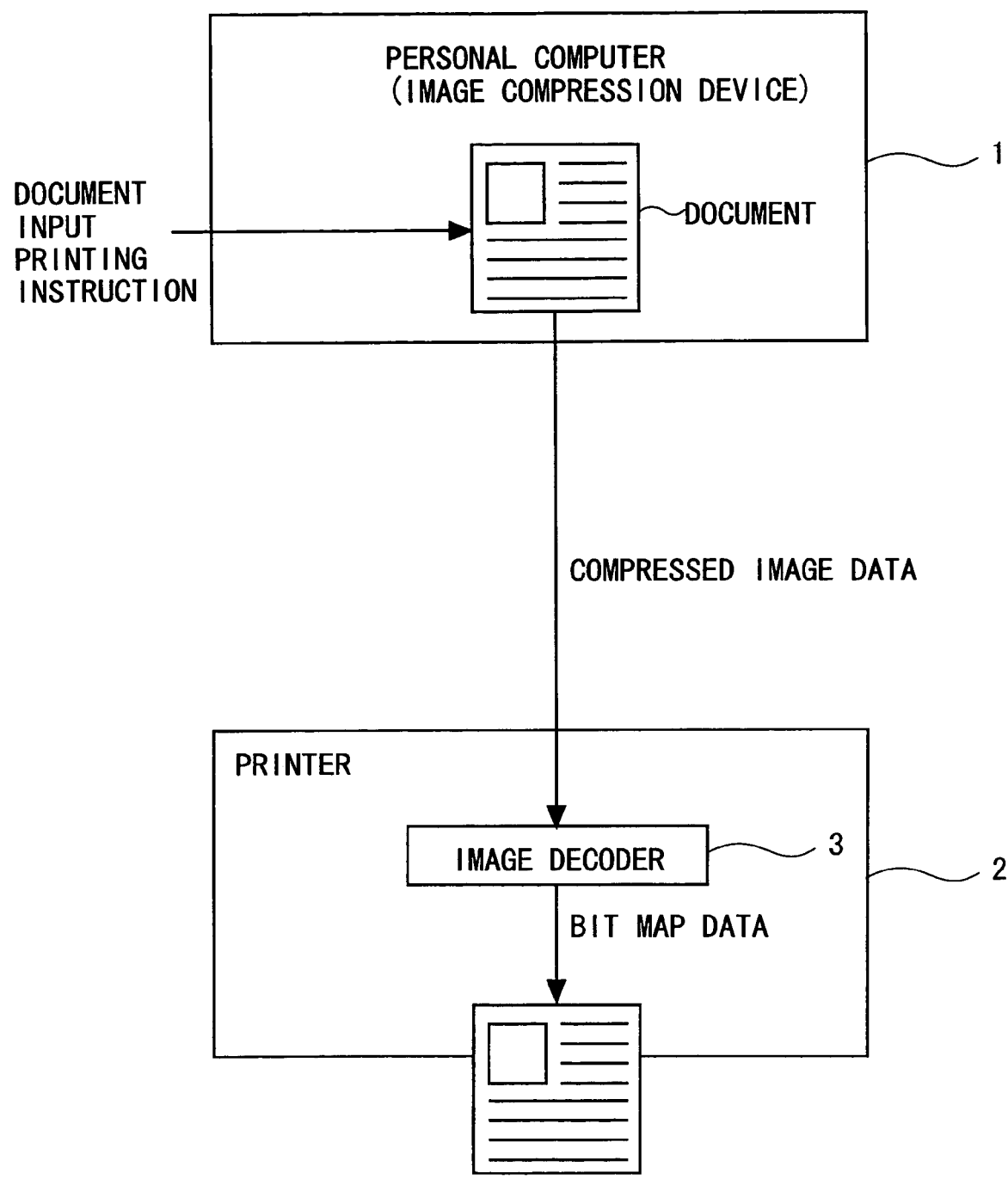
FIG. 1 is a schematic diagram of the invention.
Figure 2:
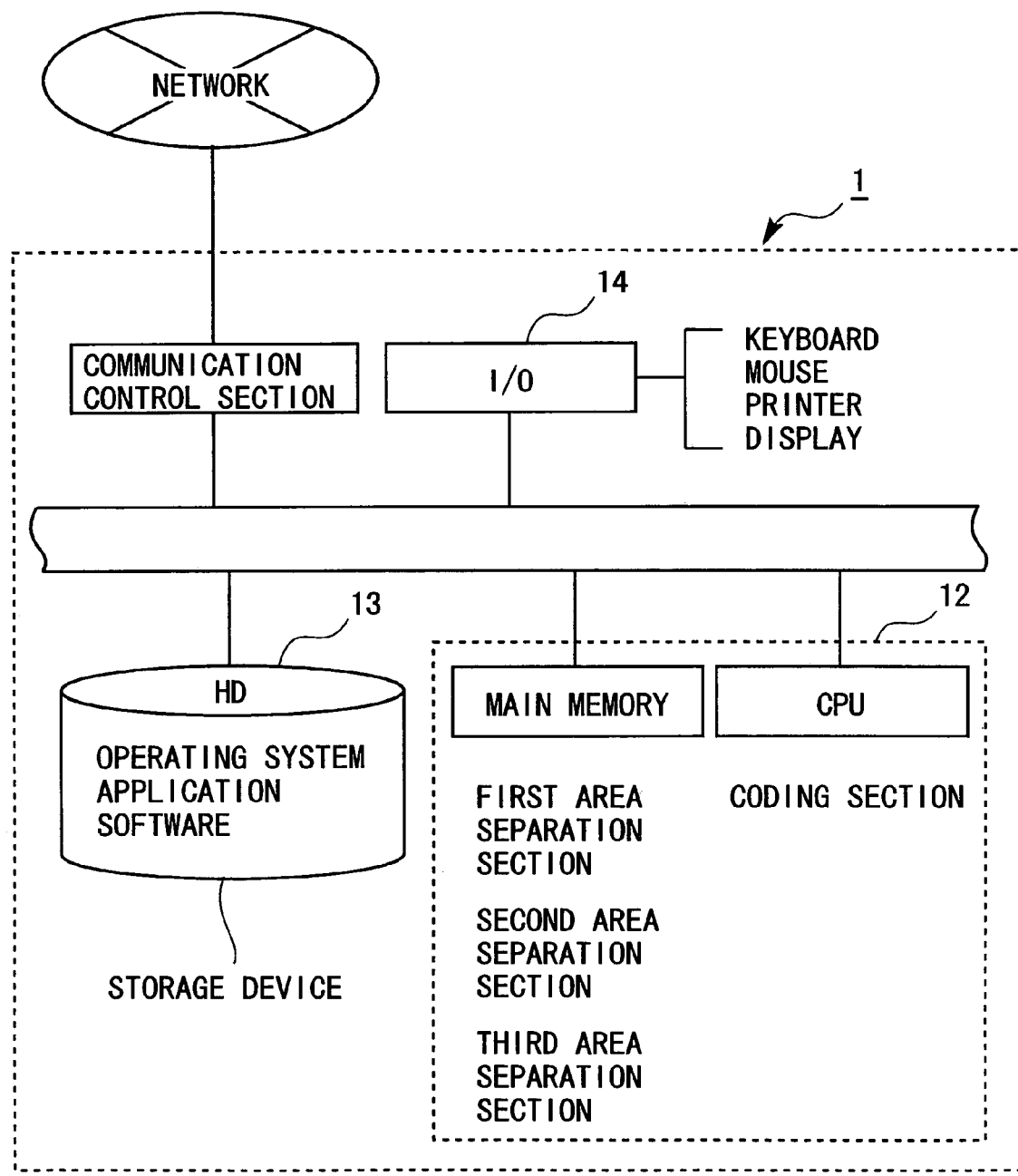
FIG. 2 is a block diagram of an image compression device.
Figure 3:
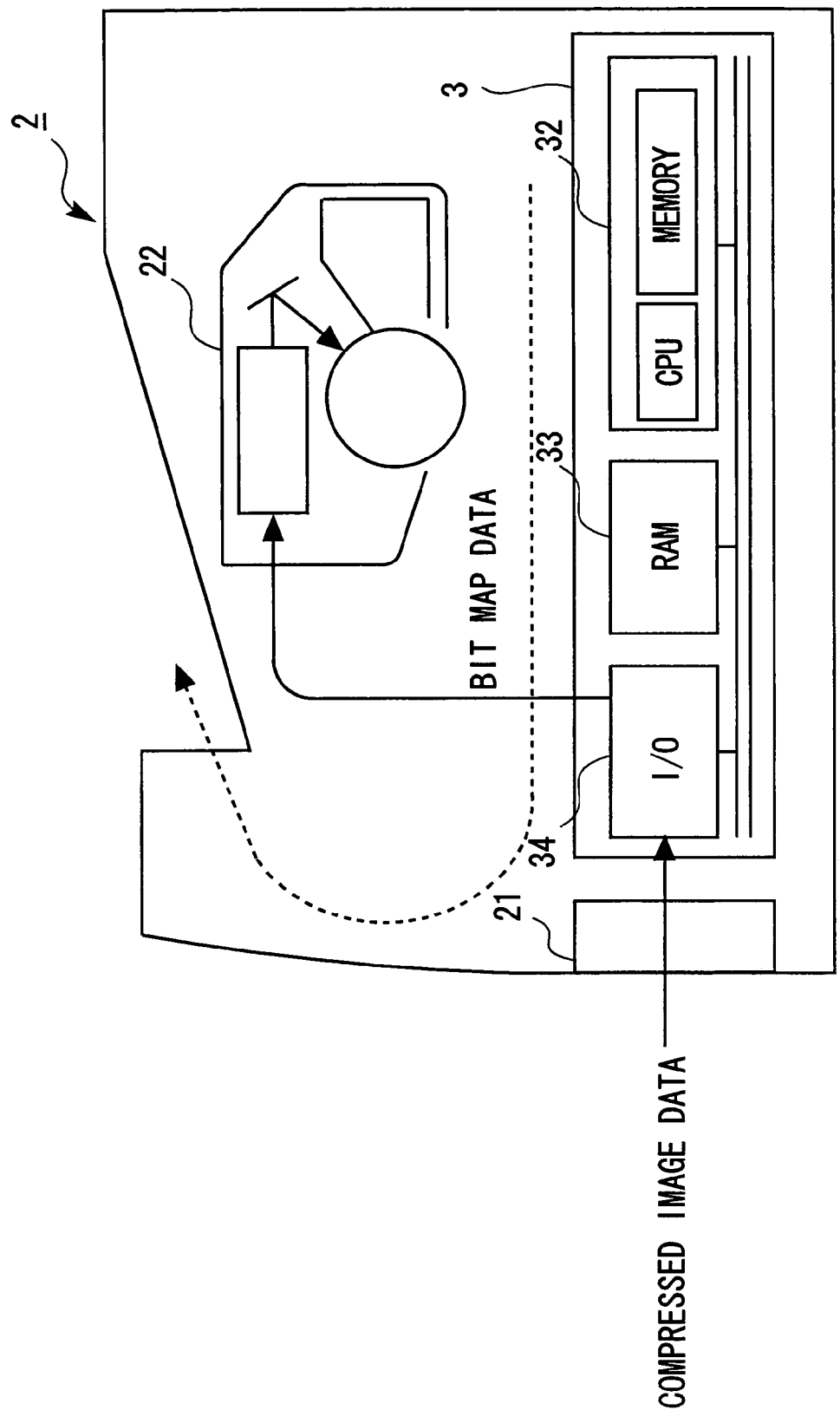
FIG. 3 is a block diagram of a printer.

FIG. 1 is a schematic diagram showing a computer 1 as an image compression device of the invention and a printer (printing device) 2. FIG. 2 is a block diagram showing a functional constitution of the image compression device 1. FIG. 3 is a block diagram showing a functional constitution of the printer 2 which includes an image decoder of the invention.

According to an embodiment, as shown in FIG. 1, the computer 1 generates bit map data of a document when the document is printed, codes (compresses) the bit map data to be compressed image data, and transfers the compressed image data to the printer 2. Then, the printer 2 that has received the compressed image data decodes the data to obtain the bit map data, and executes printing based on the bit map data.

By compressing and transferring the data to be printed, the image compression device (computer) 1 of the invention shortens the transfer time. Additionally, since not data replaced with a printer font but the bitmap data can be directly obtained, the printing device (printer) 2 of the invention needs not include a ROM or the like to store a font, and thus the device can be simplified.

As shown in FIG. 2, the image compression device of the invention is a general computer (personal computer) which includes an arithmetic operation section 12 constituted of a CPU, a main memory, and the like, a storage section (hard disk or the like) 13, an input/output (I/O) section 14, and the like.

The input/output (I/O) section 14 is an interface to which an input section such as a keyboard, a mouse, or a CD-ROM drive, and an output section such as a display, the printer 2, or a modem are properly connected.

The storage section 13 stores software such as an operating system, a program for creating a document, or an image compression program for compressing an image. Especially, the computer 1 of this embodiment includes the image compression program as a part of a printer driver.

The arithmetic operation section 12 properly reads and executes the program stored in the storage section 13. Especially, according to this embodiment, by executing the image compression program, the arithmetic operation section 12 functions as a first area separation section, a second area separation section, a third area separation section, and a coding section.

The first area separation section scans the bit map data indicating an image by an array of pixels of main scanning (horizontal direction in this embodiment) and subscanning (vertical direction in this embodiment) directions in the main scanning direction to separate the data into an area including a black pixel and an area including no black pixel by units of the predetermined number of lines.

The second area separation section scans the area including the black pixel which has been separated in the first area separation section in the subscanning direction to separate the same into a coded area coincident with a predetermined coded pattern and a noncoded area noncoincident with the coded pattern. The third area separation section separates an isolated column coincident with a predetermined isolated pattern from the noncoded area separated in the second area separation section.

When executing coding by using the areas separated in the first to third area separation sections as elements, the coding section combines a code indicating the isolated column with a code indicating the number of columns of an area adjacent to the isolated column.

As shown in FIG. 3, the printer 2 includes a data reception section 21 which receives the compressed image data from the computer 1, an image decoder 3 which decodes the compressed image data to obtain the bit map data, and a printing section 22 which prints and outputs the image based on the bit map data.

The image decoder 3 is a computer (microcomputer) which includes an arithmetic operation section 32 constituted of a CPU or the like, a storage section (RAM or the like) 33, an input/output (I/O) section 34, and the like.

The input/output (I/O) section 34 is an interface which inputs the compressed image data from the data reception section 21 to the arithmetic operation section 32, and outputs the bit map data from the arithmetic operation section 32 to the printing section 22.

The storage section 33 stores software such as an image decoding program or the like to decode the image. Additionally, the storage section 33 includes a buffer (storage area) which spools the decoded bit map data.

The arithmetic operation section 32 properly reads and executes the software stored in the storage section 33. Especially, in this embodiment, the arithmetic operation section 32 executes the image decoding program to function as a first decoding section, a second decoding section, a third decoding section, and a synthesizing section.

The first decoding section decodes a code contained in the compressed image data to be a coded area coincident with a corresponding coded pattern.

The second decoding section decodes the data to be an isolated column and an area adjacent to the isolated column based on a code indicating inclusion of the isolated column among the codes contained in the compressed image data.

The third decoding section identifies a noncoded area in the compressed image data.

The synthesizing section obtains pixel arrays by logical line units while the areas obtained in the first to third decoding sections are used as elements, and obtains bit map data by synthesizing the pixel arrays obtained by the logical line units.

This embodiment has been described by way of example in which as the image compression device 1 and the image decoder 3, the general-purpose computers realize the functions of the aforementioned sections according to the software. Not limited to this, however, the image compression device 1 and the image decoder 3 may be dedicated electronic devices which includes special electronic circuits (hardware) to execute the functions of the sections.

<Image Compression Method>

Figure 4:
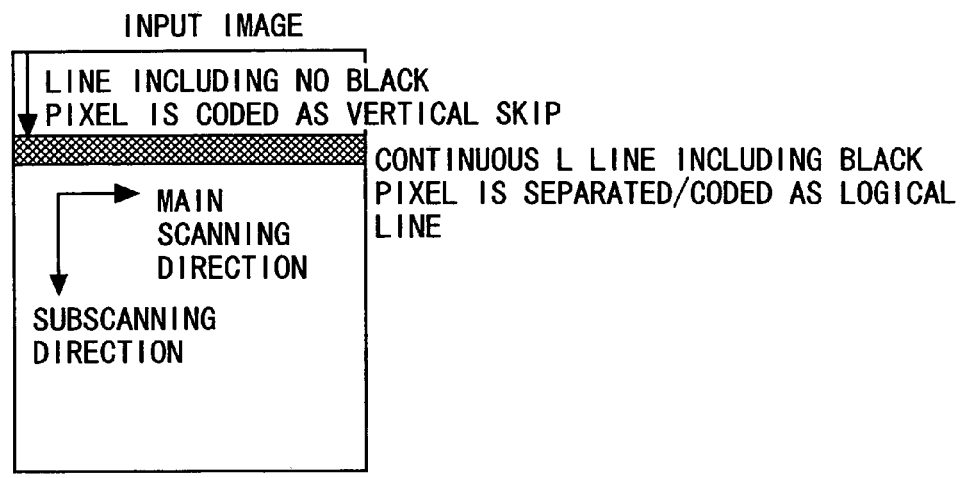
FIG. 4 is a schematic diagram of bit map data.
Figure 5:
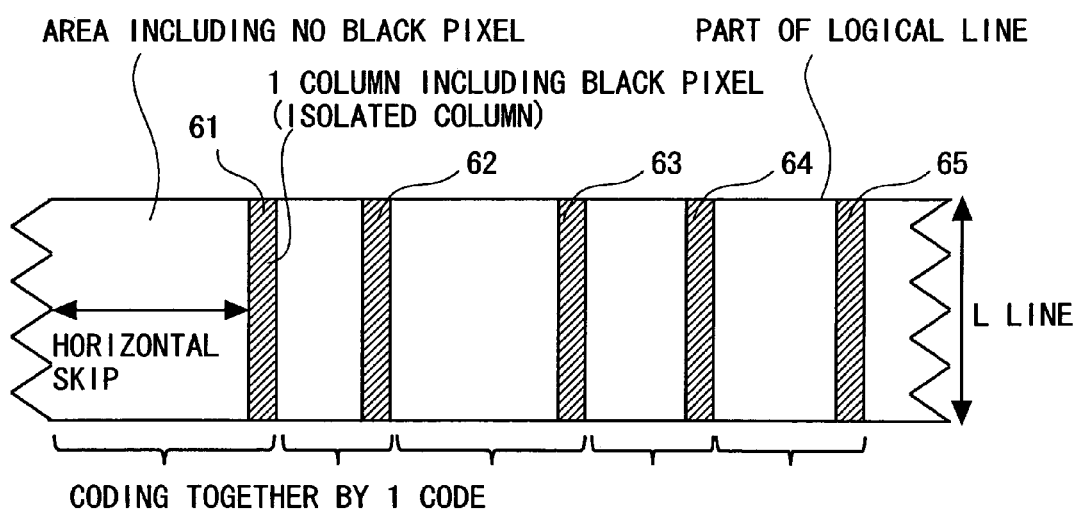
FIG. 5 is a schematic diagram of a logical line.

With reference to FIGS. 4 to 6, description will be made of an image compression method executed by the image compression device of the aforementioned constitution according to an image compression program. Note that in this embodiment, as shown in FIG. 4, an image is represented by a pixel array of main scanning (horizontal) and subscanning (vertical) directions. A pixel continuous in the main scanning direction is called a line, and a pixel continuous in the subscanning direction is called a column. Bit map data enumerates values of the pixels that constitute the image (e.g., white pixel is 0 and black pixel is 1 in the case of a binary image) according to positions of the pixels. According to this embodiment, this bit map data is separated by logical line units which are integers L of 1 or more to execute coding (FIG. 5). The number of logical lines can optionally be set. Preferably, however, the number is a multiple of 8 to match a processing unit of the computer. Especially, logical line L=8 is preferable when a text or the like is output by the printer. Moreover, the logical line may vary depending on image resolution. For example, L=8 is set if the bit map data is 600 dpi, and it may be varied to L=16 if the bit map data is 2400 dpi.

When a user instructs printing of a document such as a text or a photograph, the computer 1 creates bit map data of the document, starts compression of the bit map data according to the image compression program contained in the printer driver as shown in FIG. 6, and executes the following steps S101 to S115.

S101:

As preprocessing, the image is separated by block units, and replacement processing with a difference image obtained by XOR with a near block is executed. This replacement processing with the difference image will be detailed later.

S102:

The first area separation section scans the image line by line in the main scanning direction, and identifies a line including a black pixel or a line (white line) including no black pixel (main scanning step).

S103:

The lines identified in step S102 are sequentially selected from an upper end.

S104:

Determination is made as to whether the lines selected in step S103 are white lines or not. If white lines are determined, the process proceeds to step S105, and to step S106 if not.

S105:

The white line, i.e., the area including no black pixel is separated as a vertical skip, and coding is executed by using the number of white lines. For example, a code is used which combines a code indicating the vertical skip with a code indicating the number of lines.

S106:

8 lines (logical lines) including the line selected in step S103 are extracted. That is, the area including the black pixel is separated by a logical line unit. According to this embodiment, the steps S103 to S106 are equivalent to the first area separation step.

S107:

The logical lines extracted in step S106 are scanned in the subscanning direction, and a column including a black pixel and a column including no black pixel are identified. These columns are compared with a predetermined coded pattern, and separated into an area (coded area) which coincides with the coded pattern and a noncoded area (area not to be coded) noncoincident with the coded pattern. For example, as described in Japanese Patent No. 3278298, and Japanese Patent Application Laid-Open Nos. 2003-198855, 2003-189108, and 2003-198856, a code is allocated beforehand to a pixel value array pattern of a high frequency of appearance, and an area coincident with the pattern to which the code has been allocated (coded pattern) is separated (second area separation step).

S108:

The areas separated in step S107 are sequentially selected from a head.

S109:

When the areas selected in step S108 are all white areas (horizontal skips) including no black pixels, the process proceeds to step S111, and to step S110 in the case of the areas including the black pixels.

S110:

The coding is executed by a conventional coding method. For example, as described in the aforementioned Patent Publications, when the area including the black pixel coincides with the predetermined coded pattern, the coding is executed by the code allocated to the coded pattern, the number of repetitive times, or the like. On the other hand, when the area including the black pixel does not coincide with the coded pattern, a pixel value thereof is output.

S111:

Determination is made as to whether there is an isolated column or not after all the white areas selected in step S108. That is, determination is made as to whether an area next to all the white areas is a noncoded area or not, and whether its head coincides with a predetermined isolated pattern or not. As a result, the process proceeds to step S112 when there is no isolated column, and to step S113 when there is an isolated column.

S112:

All the white areas are coded as horizontal skips in a logical line by using the number of columns thereof.

S113:

An isolated column coincident with the predetermined isolated pattern is separated from the noncoded area next to all the white areas (third area separation step).

S114:

The isolated column separated in step S113 is coded by a code allocated to the isolated pattern (coding step).

S115:

Determination is made as to completion of the coding of the logical lines extracted in step S106. The process returns to step S108 when not completed, and proceeds to step S116 when completed.

S116:

Determination is made as to whether there is an unprocessed line or not. The process returns to step S103 when there is an unprocessed line, and finishes the compression processing to output the coded compressed image data when there is no unprocessed line.

<Detailed Description of Coding>

The conventional coding of steps S110, S112 is processing for an area to which the code has been allocated beforehand and in which a frequency of appearance is high and the number of columns is 2 or more. That is, by allocating the code, the coding can be applied to an area only in which the amount of data is smaller than enumeration of pixel values. Thus, portions uncompressed by the conventional coding are left as uncompressed areas 61 to 65 as shown in FIG. 5.

A frequency of appearance of the number of columns left as the uncompressed areas 61 to 65 as shown in FIG. 5 is as shown in FIG. 7 according to studies conducted by the inventors of the present invention. In FIG. 7, an abscissa indicates the number of columns of an uncompressed area, and an ordinate indicates a frequency of appearance. As apparent from characteristics of FIG. 7, a frequency of appearance of the number of columns of the noncoded area is higher as the number of columns is smaller, a frequency of appearance is highest in an area of 1 column, and a frequency of appearance is lower as the number of columns is larger.

Thus, according to this embodiment, paying attention to the characteristics of the uncompressed area of FIG. 7, 1 column of the noncoded area is separated as an isolated column, and coded in combination with an adjacent area (area immediately before in this embodiment), whereby a compression ratio is increased. That is, according to this embodiment, 1 head column of the noncoded area is set as an isolated pattern. When there is a noncoded area, 1 head column thereof is set as an isolated column irrespective of a pixel pattern. Incidentally, the isolated pattern is not limited to 1 column, but it may be a plurality of columns or varied at a predetermined number of columns or less.

A method of allocating a code when the isolated column exists will be described in detail by comparing this embodiment with the conventional example with reference to FIGS. 8 to 11.

Figure 8A:
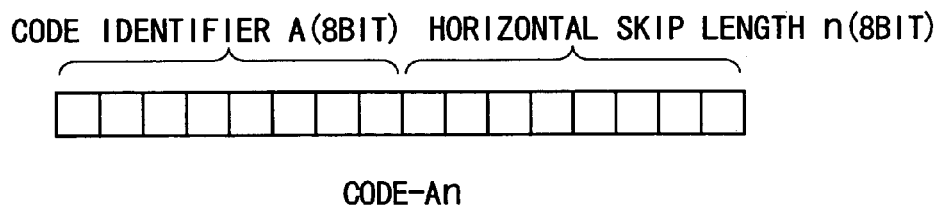
FIGS. 8A and 8B are diagrams showing conventional codeword examples.
Figure 8B:
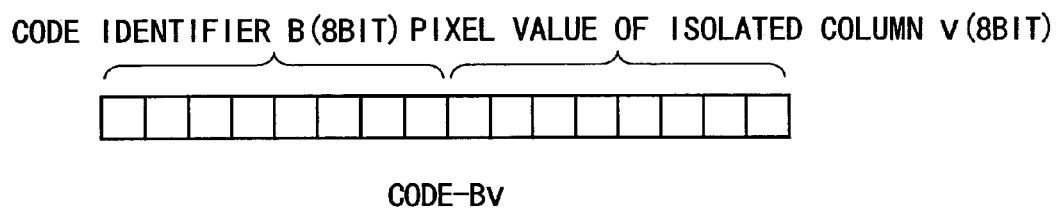

FIG. 8 shows code allocation examples of the conventional coding method, showing a code CODE-A indicating a horizontal skip and a code CODE-B indicating an isolated column. In the CODE-A, 8 bits (1 byte) are allocated to each of a code identifier which indicates a horizontal skip and a horizontal skip length. In the CODE-B, 8 bits (1 byte) are allocated to each of a code identifier which indicates an isolated column and a pixel value of the isolated column. Accordingly, code sizes of the CODE-A and the CODE-B are both 2 bytes.

Figure 9:
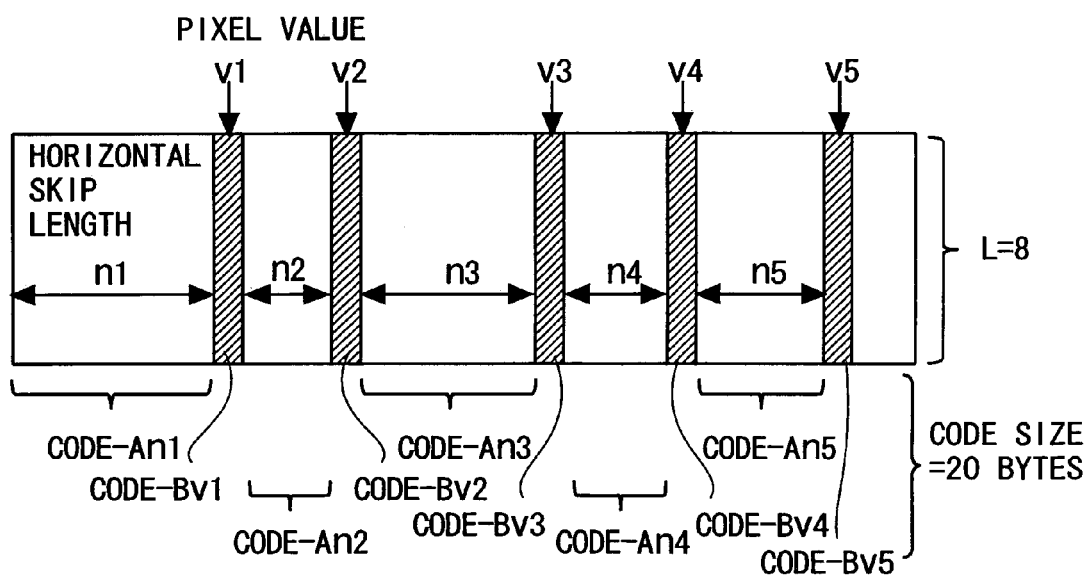
FIG. 9 is an explanatory diagram of coded data by conventional coding method.

FIG. 9 shows an example of a code when codewords of FIG. 8 are applied to parts of a logical line, showing a situation in which 5 code columns are coded. A code data size by the conventional coding method is (2 bytes+2 bytes)×5=20 bytes.

Next, description will be made of code allocation according to a first embodiment of the invention.

Figure 10:
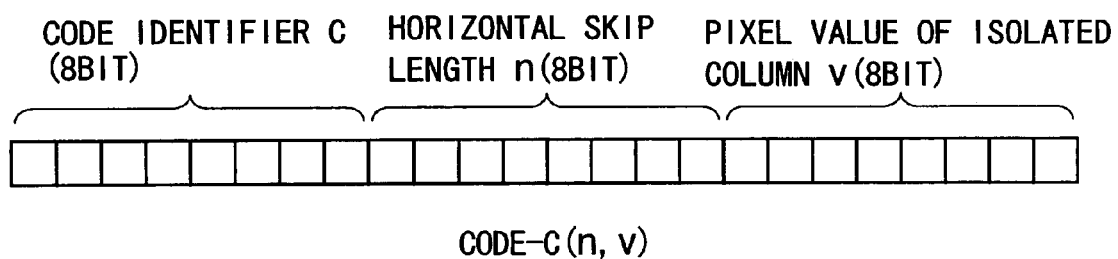
FIG. 10 is a diagram showing a codeword example 1 of the invention.

FIG. 10 is an example of code allocation of the invention, showing a code which combines a horizontal skip with an isolated column. In this example, 8 bits (1 byte.) are allocated to each of a codeword identifier CODE-C, a horizontal skip length, and a pixel value of an isolated column, and a size of 1 code is totally 3 bytes.

Figure 11:
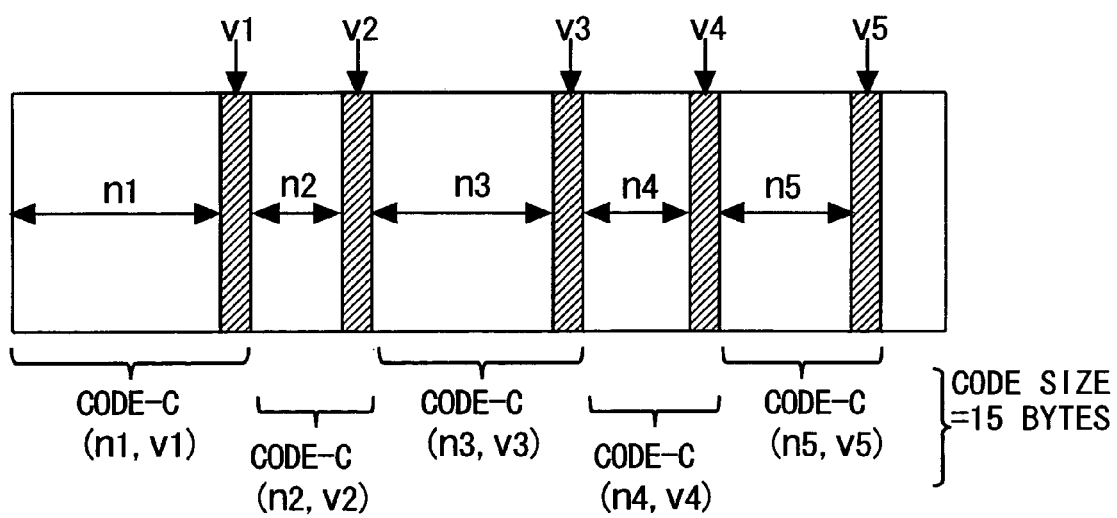
FIG. 11 is an explanatory diagram of coded data by a coding method of the invention.

FIG. 11 shows a situation of coding when a codeword of FIG. 10 is applied to the same image as that of FIG. 9. According to this embodiment, a code size is 3 bytes×5=15 bytes, and smaller by 25% compared with that of the conventional coding method.

Figure 12A:
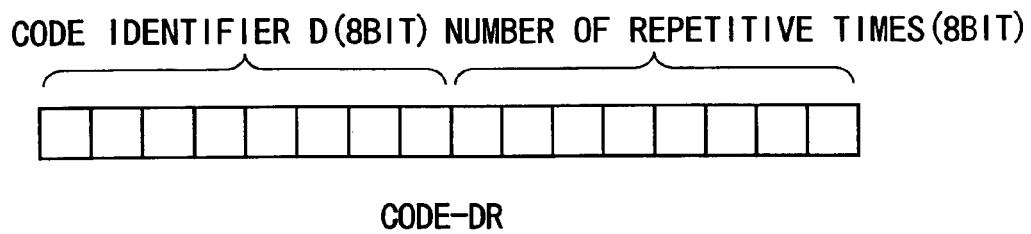
FIGS. 12A and 12B are diagrams showing codeword examples 2 of the invention.
Figure 12B:
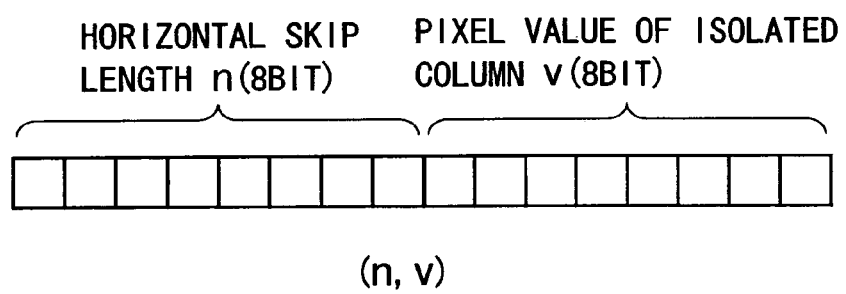

FIG. 12 shows code allocation according to a second embodiment of the invention, showing a code which combines a horizontal skip, an isolated column, and the number of repetitive times. In this example, 8 bits (1 byte) are allocated to each of a codeword identifier CODE-D, the number of repetitive times, a horizontal skip length, and a pixel value of an isolated column, and a size of 1 code is 2 bytes+2 byes×the number of repetitive times.

Figure 13:
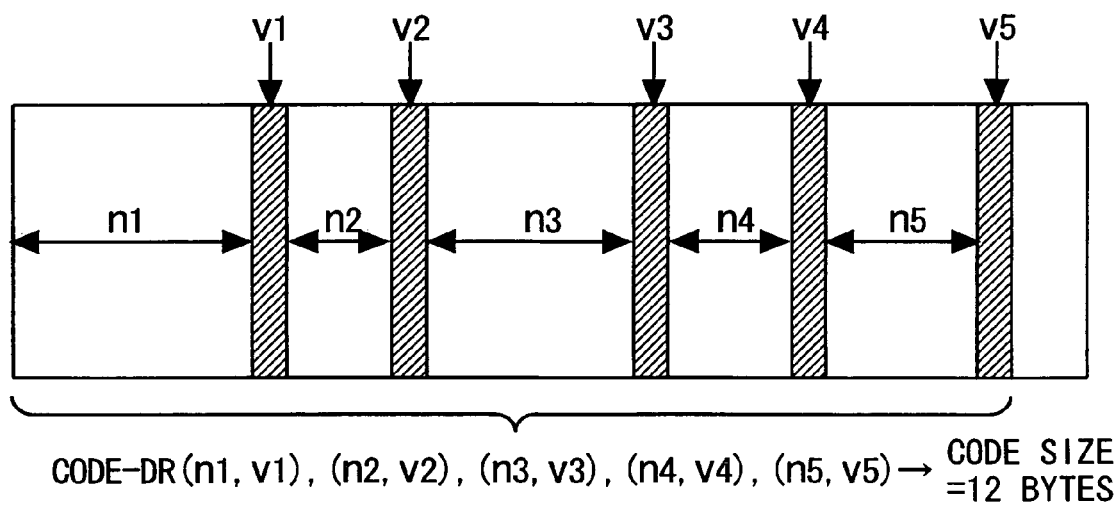
FIG. 13 is an explanatory diagram of coded data by the coding method of the invention.

FIG. 13 shows a situation of coding when the codeword of FIG. 11 is applied to the same image as that of each of FIG. 8. According to this embodiment, a code size is 2 bytes+2 bytes×5=12 bytes, and smaller by 40% compared with that of the conventional coding method.

According to the aforementioned code allocation of the first and second embodiments of the invention, 8 bits are allocated to each code. However, the number of bits is not limited to 8. For example, a bit length of the code identifier can be decided in view of the other codeword, and a shorter bit length can be allocated when a choice of codewords is smaller.

For a horizontal skip length, a bit length may be varied according to a length. For example, 4 bits are used for representation when the horizontal skip length is less than 16, and 8 bits can additionally be allocated when it is equal to or more than 16.

For the code indicating the isolated column, instead of using the pixel value itself as in the case of the embodiments, a number indicating positions or the number of black pixels or a predetermined pixel value may be used as a code.

Figure 14:
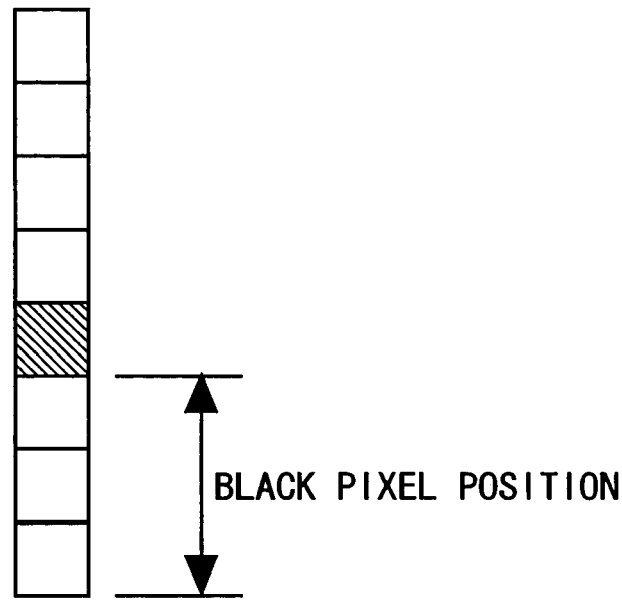
FIG. 14 is an explanatory diagram of a black pixel position in an isolated column which includes 1 black pixel.

For example, the isolated pattern may be set to 1 column including only 1 black pixel in the column, and an isolated column of this pixel pattern may selectively be separated. When the coding is executed, as shown in FIG. 14, an existent position of the black pixel in the column may be used as a code indicating the isolated column.

Accordingly, when the number of logical lines is 8, 8 bits are necessary if the pixel value itself is used as a code of the isolated column. However, when the case is specified to the isolated column including 1 black pixel, there are 8 black pixel positions. Thus, the coding can be executed by a 3-bit numerical value.

Figure 15:
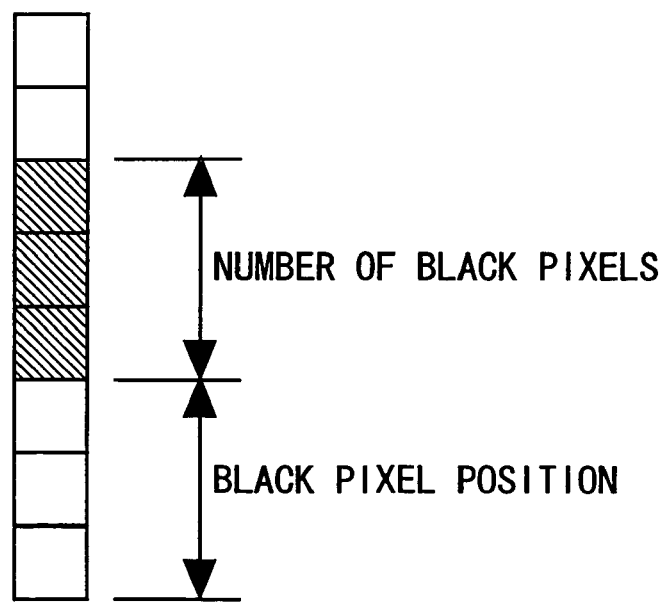
FIG. 15 is an explanatory diagram of black pixel positions and the number of black pixels in an isolated column which includes N black pixels.

Further, the isolated pattern may be set to 1 column including only N (N is an integer of 1 or more) continuous black pixels, and an isolated column of this pixel pattern may selectively be separated. When the coding is executed, existent positions of the black pixels or the number of black pixels in the column may be used as a code indicating the isolated column as shown in FIG. 15.

Accordingly, when the number of logical lines is 8, there is a maximum of 8 black pixel positions, and the number of included black pixels is 1 to 8. Thus, by allocating 3 bits to each, the coding can be executed by totally 6 bits.

In this case, the number of code bits can be made much smaller by reducing the maximum number of target black pixels. For example, when a target is limited to an isolated column which includes a maximum of 4 continuous black pixels, only 2 bits need be allocated to a code of the number of black pixels. By adding 3 bits of a code indicating the black pixel, the coding can be executed by totally 5 bits.

Figure 16:
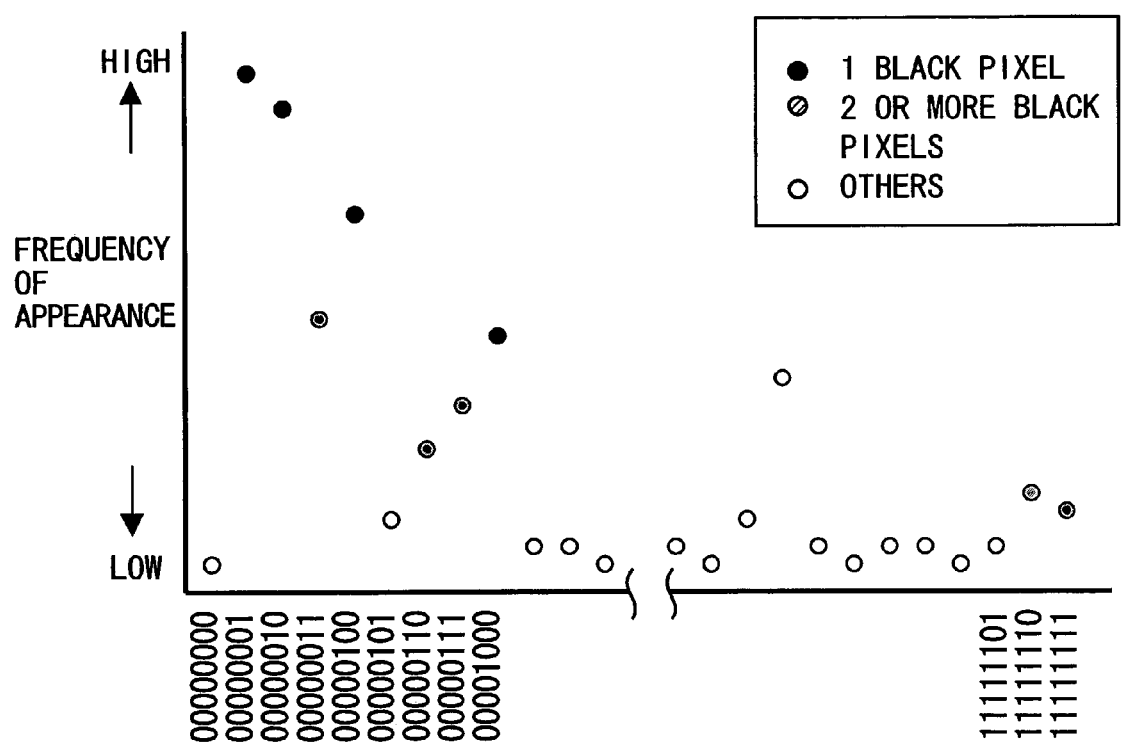
FIG. 16 is a distribution diagram showing a relation between a pixel value and a frequency of appearance of an uncompressed area of 1 column.

Additionally, a frequency of appearance of a pixel pattern of a black pixel included in 1 column whose frequency of appearance is highest is as shown in FIG. 16. Thus, unevenness characteristically exists in a frequency of appearance of a specific pattern. In FIG. 16, the number of black pixels which is 1 bit in the pixel pattern is represented by a numeral on a side of a corresponding point of the frequency of appearance.

Thus, when the isolated column is separated, an isolated column having a pixel value coincident with a predetermined isolated pattern of a high frequency of appearance may selectively be separated. When the coding is executed, a number allocated beforehand to the isolated pattern may be used as a code indicating the isolated column.

Further, since input images are various and different in characteristics, frequencies of appearance of uncompressed areas of 1 column from the input images may be obtained, e.g., as shown in FIG. 16. Then, by selecting and deciding a pattern of a high frequency of appearance therefrom as an isolated pattern, an isolated pattern suitable for increasing coding efficiency may be selected for each image.

Figure 17:
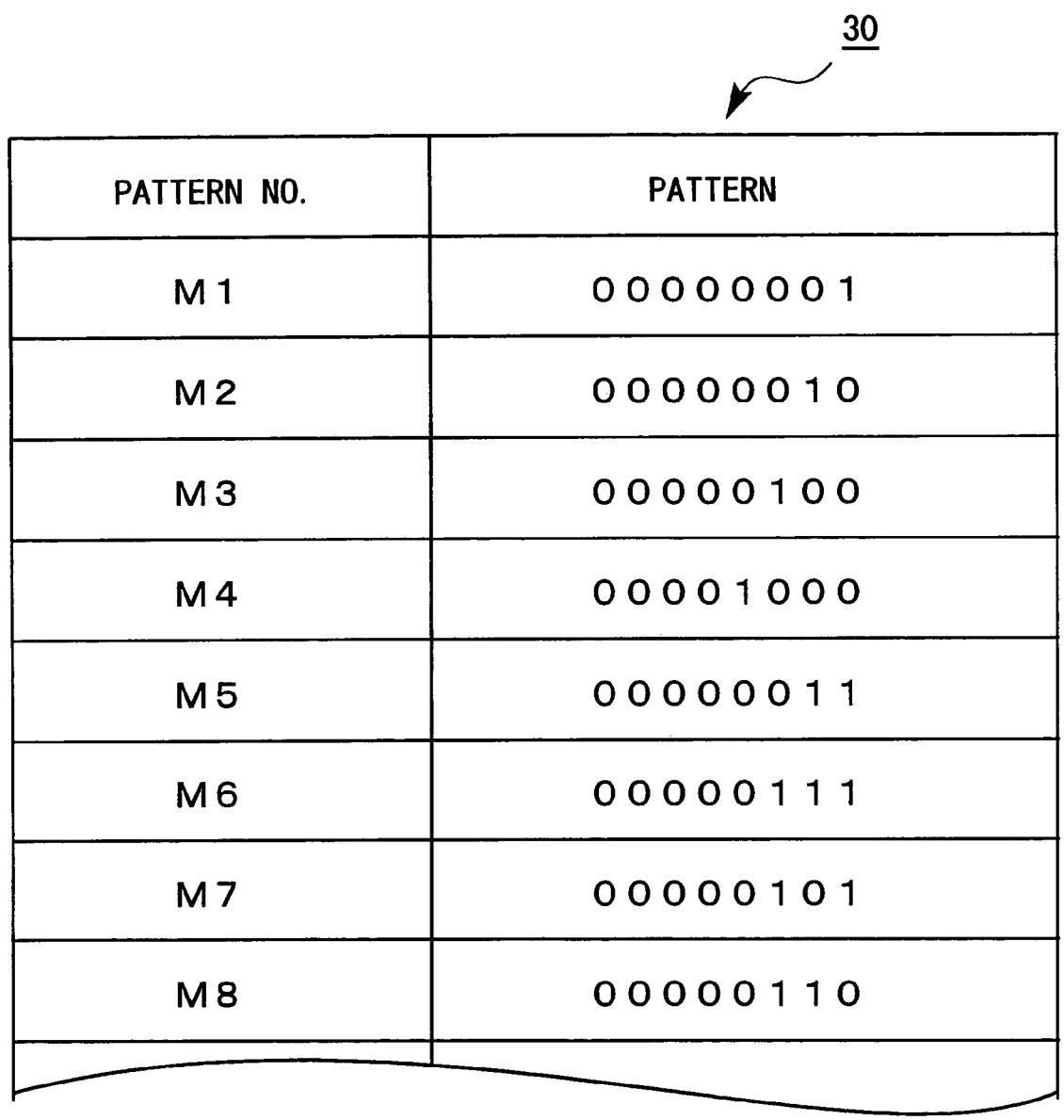
FIG. 17 is an explanatory diagram of a reference pattern file in which reference patterns are registered in order of a high frequency of appearance.

FIG. 17 is an example of a reference pattern file 30 in which reference patterns are registered in order of a high frequency of appearance regarding the frequencies of appearance for the pixel values of the uncompressed areas of 1 column of FIG. 16. The file 30 includes pattern numbers and patterns arranged in order of a high frequency of appearance. The number of patterns registered in the reference pattern file 30 is decided according to the number of bits of each of codewords allocated to the pattern numbers.

<Preprocessing>

Figure 18:
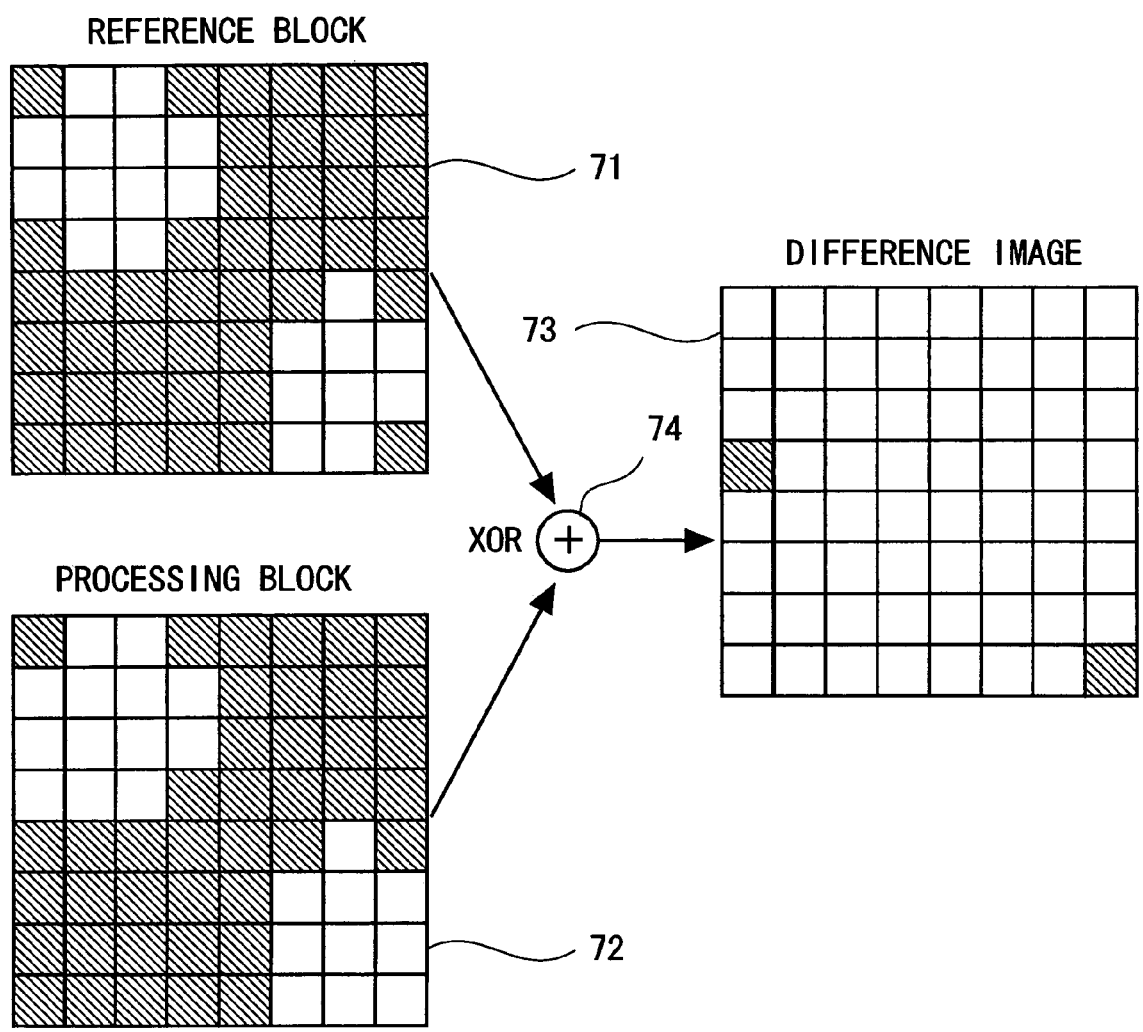
FIG. 18 is an explanatory diagram of preprocessing (XOR processing).

FIG. 18 is an explanatory diagram showing an exclusive OR operation used as preprocessing during the compression of the invention. In FIG. 18, for a processing block 72, an example in which vertical and horizontal pixels are M×N=8×8 is taken. A difference image 73 is generated by performing an exclusive OR operation (XOR) 74 between the processing block 72 currently targeted to be processed and a reference block 71 selected from processed blocks. When an exclusive OR operation is performed for the pixels of the same pixel positions of the processing block 72 and the reference block 71, a portion only in which pixel values of the same position of both blocks are different, i.e., a portion of a white pixel to a black pixel or a black pixel to a white pixel, is left as a black pixel in the difference image 73. Thus, in the case of a dither image in which a pattern shape continuously changes as in the case of gradation, a pixel value correlation between adjacent blocks is high, and the number of back pixels in the difference image is smaller as a correlation is higher. In the case of blocks of the same pixel arrangement, pixels in the difference image become all white, whereby a compression ratio can be increased.

<Decoding of Compressed Image Data>

Figure 19:
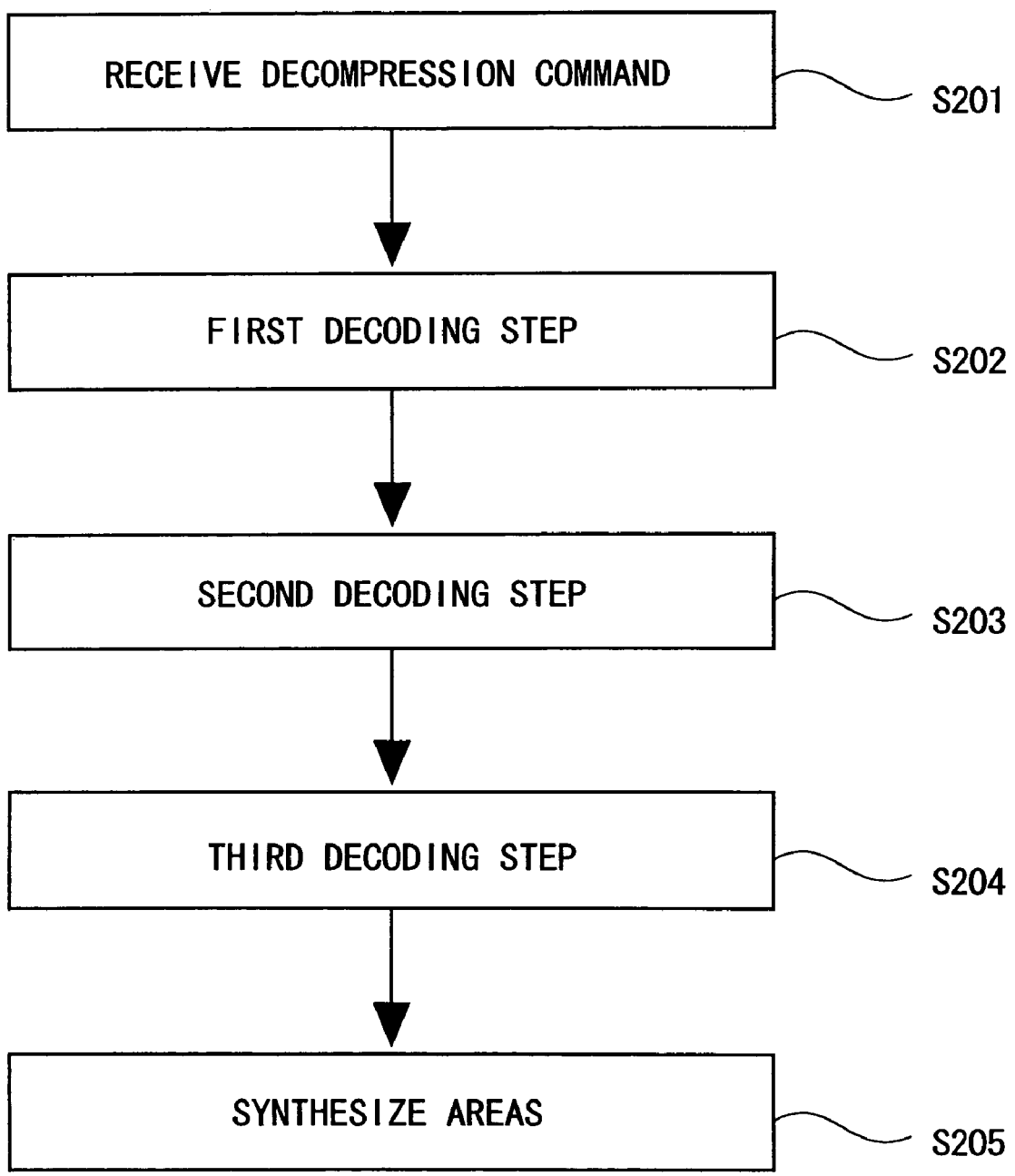
FIG. 19 is an explanatory diagram of an image decoding method.
Figures 20A, 20B:
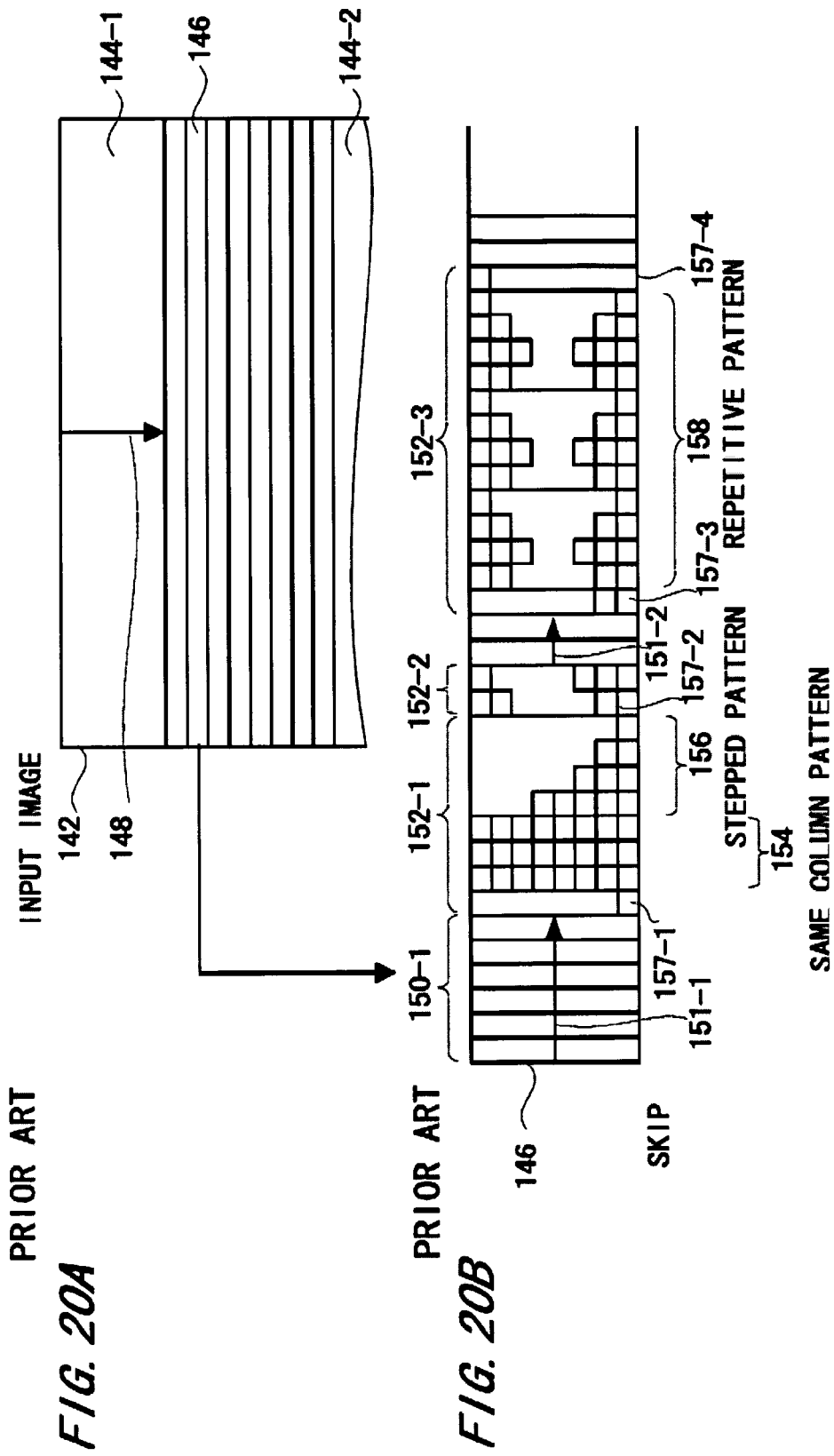

The printer 2 that has received the compressed image data coded in the aforementioned manner executes the following steps by the image decoder 3 as shown in FIG. 19.

S201:

Upon reception of the compressed image data from the computer 1, the printer 2 recognizes the reception of a decompression and printing command of the data, and proceeds to step S202 to start a decoding process.

S202:

A code contained in the compressed image data is decoded to be a coded area coincident with a corresponding coded pattern reversely to the previous coding.

S203:

The data is decoded to be an isolated column and an area adjacent to the isolated column based on a code indicating inclusion of the isolated column among codes contained in the compressed image data.

S204:

A noncoded area is identified from the compressed image data.

S205:

The areas obtained in steps S201 to S204 are used as elements to obtain pixel arrays by logical line units, and the pixel arrays obtained by the logical lines are synthesized to obtain bit map data.

The printer 2 sends the bit map data decoded by the image decoder 3 to the printing section 22, and printing is executed by the printing section 22 based on the bit map data.

As described above, according to the compression method of the bit map data of this embodiment, the compression ratio can be increased by coding the horizontal skip and the isolated column together which have conventionally been coded separately. As a result, the compressed data size of the print image is reduced to shorten the transfer time to the printer, and to shorten the printing time from the printing instruction to its completion, thereby contributing to improvement of usability of the printer.

Incidentally, according to the invention, each pixel value is referred to as the white pixel (first pixel value) or the black pixel (second pixel value) for convenience. However, the pixel values are not limited to black and white. There need be only two kinds of pixel values.

The two kinds of pixel values are not limited to binary values. They may be multiple values such as 0 and others (1 to 254).

Furthermore, the invention may be applied to bit map data of each color when bit map data of a plurality of colors (e.g., red, green, and blue) constitute a color image.

OTHER EMBODIMENTS

The present invention is not limited to the embodiments described above with reference to the drawings. Needless to say, various changes can be made without departing from the gist of the invention.

INDUSTRIAL APPLICABILITY

The invention can be used not only for compressing an image to be printed but also for compressing image data to be displayed by the display device and image data to be stored in the storage device. For example, when an image is transmitted to the potable telephone to be displayed, the communication time and costs can be reduced by compressing and transmitting the bit map data.

What is claimed is:

1. An image compression method executed by a computer, comprising:
    a main scanning step of scanning bit map data which indicates an image by an array of pixels of main scanning and subscanning directions in the main scanning direction;
    a first area separation step of separating the data into an area including a black pixel and an area including no black pixel by units of a predetermined number of logical lines based on a result of the main scanning;
    a subscanning step of scanning the area including the black pixel which has been separated in the first area separation step in the subscanning direction;
    a second area separation step of separating the data into a coded area coincident with a predetermined coded pattern and a noncoded area noncoincident with the coded pattern;
    a third area separation step of separating an isolated column coincident with a predetermined isolated pattern from the noncoded area separated in the second area separation step; and
    a coding step of coding the areas by combining a code indicating the isolated column with a code indicating the number of columns of an area adjacent to the isolated column when the areas separated in the first to third area separation steps are coded as elements.

2. An image compression method according to claim 1, wherein the isolated pattern, the number of column is 1, and all the lines are black pixels or specific lines are black pixels.

3. An image compression method according to claim 1, wherein the area adjacent to the isolated column is an area which includes no black pixel.

4. An image compression method according to claim 1, wherein the coding step includes, when the isolated column repeatedly appears, performing coding by combining a code indicating the number of repetitive times of the isolated column with the code indicating the isolated column and the code indicating the number of columns of the area adjacent to the isolated area.

5. An image compression method according to claim 1, wherein:
    the third area separation step includes selectively separating an isolated column including only 1 black pixel therein; and
    the coding step includes performing coding by using an existent position of the black pixel in the column as a code indicating the isolated column.

6. An image compression method according to claim 1, wherein:
    the third area separation step includes selectively separating an isolated column that includes only N (N is an integer of 1 or more) continuous black pixels; and
    the coding step includes performing coding by using existent positions of the black pixels and the number of black pixels in the column as a code indicating the isolated column.

7. An image compression method according to claim 1, wherein:
    the third area separation step includes selectively separating an isolated column having a pixel value coincident with a predetermined isolated pattern; and
    the coding step includes performing coding by using a number allocated beforehand to the isolated pattern as a code indicating the isolated column.

8. An image compression device characterized by comprising:
    a first area separation section which scans bit map data indicating an image by an array of pixels of main scanning and subscanning directions in the main scanning direction to separate the data into an area including a black pixel and an area including no black pixel by units of a predetermined number of lines;
    a second area separation section which scans the area including the black pixel which has been separated in the first area separation section in the subscanning direction to separate the area into a coded area coincident with a predetermined coded pattern and a noncoded area noncoincident with the coded pattern;
    a third area separation section which separates an isolated column coincident with a predetermined isolated pattern from the noncoded area separated in the second area separation section; and
    a coding section which codes the areas by combining a code indicating the isolated column with a code indicating the number of columns of an area adjacent to the isolated column when the areas separated in the first to third area separation sections are coded as elements.

9. An image compression device according to claim 8, wherein the isolated pattern, the number of column is 1, and all the lines are black pixels or specific lines are black pixels.

10. An image compression device according to claim 8, wherein the area adjacent to the isolated column is an area which includes no black pixel.

11. An image compression device according to claim 8, wherein when the isolated column repeatedly appears, the coding section performs coding by combining a code indicating the number of repetitive times of the isolated column with the code indicating the isolated column and the code indicating the number of columns of the area adjacent to the isolated area.

12. An image compression device according to claim 8, wherein:
    the third area separation section selectively separates an isolated column including only 1 black pixel therein; and
the coding section performs coding by using an existent position of the black pixel in the column as a code indicating the isolated column.

13. An image compression device according to claim 8, wherein:
    the third area separation section selectively separates an isolated column that includes only N (N is an integer of 1 or more) continuous black pixels; and
    the coding section performs coding by using existent positions of the black pixels and the number of black pixels in the column as a code indicating the isolated column.

14. An image compression device according to claim 8, wherein:
    the third area separation section selectively separates an isolated column having a pixel value coincident with a predetermined isolated; and the coding section performs coding by using a number allocated beforehand to the isolated pattern as a code indicating the isolated column.

15. A computer-readable storage medium having an image compression program of instructions executable by the computer to perform a method comprising:

a main scanning step of scanning bit map data which indicates an image by an array of pixels of main scanning and subscanning directions in the main scanning direction;

a first area separation step of separating the data into an area including a black pixel and an area including no black pixel by units of a predetermined number of logical lines based on a result of the main scanning;

a subscanning step of scanning the area including the black pixel which has been separated in the first area separation step in the subscanning direction;

a second area separation step of separating the data into a coded area coincident with a predetermined coded pattern and a noncoded area noncoincident with the coded pattern;

a third area separation step of separating an isolated column coincident with a predetermined isolated pattern from the noncoded area separated in the second area separation step; and a coding step of coding the areas by combining a code indicating the isolated column with a code indicating the number of columns of an area adjacent to the isolated column when the areas separated in the first to third area separation steps are coded as elements.

16. A computer-readable storage medium having an image compression program according to claim 15, wherein the isolated pattern, the number of column is 1, and all the lines are black pixels or specific lines are black pixels.

17. A computer-readable storage medium having an image compression program according to claim 15, wherein the area adjacent to the isolated column is an area which includes no black pixel.

18. A computer-readable storage medium having an image compression program according to claim 15, wherein the coding step includes, when the isolated column repeatedly appears, performing coding by combining a code indicating the number of repetitive times of the isolated column with the code indicating the isolated column and the code indicating the number of columns of the area adjacent to the isolated area.

19. A computer-readable storage medium having an image compression program according to claim 15, wherein:

the third area separation step includes selectively separating an isolated column including only 1 black pixel therein; and the coding step includes performing coding by using an existent position of the black pixel in the column as a code indicating the isolated column.

20. A computer-readable storage medium having an image compression program according to claim 15, wherein:

the third area separation step includes selectively separating an isolated column that includes only N (N is an integer of 1 or more) continuous black pixels; and the coding step includes performing coding by using existent positions of the black pixels and the number of black pixels in the column as a code indicating the isolated column.

21. A computer-readable storage medium having an image compression program according to claim 15, wherein:

the third area separation step includes selectively separating an isolated column having a pixel value coincident with a predetermined isolated pattern; and the coding step includes performing coding by using a number allocated beforehand to the isolated pattern as a code indicating the isolated column.

22. An image decoding method executed by a computer, comprising:

a command receiving step of receiving a decompression command of image data compressed by the image compression method, wherein the image compression method includes, a main scanning step of scanning bit map data which indicates an image by an array of pixels of main scanning and subscanning directions in the main scanning direction, a first area separation step of separating the data into an area including a black pixel and an area including no black pixel by units of a predetermined number of logical lines based on a result of the main scanning, a subscanning step of scanning the area including the black pixel which has been separated in the first area separation step in the subscanning direction, a second area separation step of separating the data into a coded area coincident with a predetermined coded pattern and a noncoded area noncoincident with the coded pattern, a third area separation step of separating an isolated column coincident with a predetermined isolated pattern from the noncoded area separated in the second area separation step, and a coding step of coding the areas by combining a code indicating the isolated column with a code indicating the number of columns of an area adjacent to the isolated column when the areas separated in the first to third area separation steps are coded as elements;

a first decoding step of decoding a code contained in the compressed image data to be a coded area coincident with a corresponding coded pattern;

a second decoding step of decoding the data to be an isolated column and an area adjacent to the isolated column based on a code indicating inclusion of the isolated column among codes contained in the compressed image data;

a third decoding step of identifying a noncoded area in the compressed image data; and a synthesizing step of obtaining pixel arrays by logical line units while the areas obtained in the first to third steps are used as elements, and synthesizing the pixel arrays obtained by the logical lines to obtain bit map data.

23. An image decoder decoding a compressed image data which have been received from an image compression device, the image compression device comprising:

a first area separation section which scans bit map data indicating an image by an array of pixels of main scanning and subscanning directions in the main scanning direction to separate the data into an area including a black pixel and an area including no black pixel by units of a predetermined number of lines;

a second area separation section which scans the area including the black pixel which has been separated in the first area separation section in the subscanning direction to separate the area into a coded area coincident with a predetermined coded pattern and a noncoded area noncoincident with the coded pattern;

a third area separation section which separates an isolated column coincident with a predetermined isolated pattern from the noncoded area separated in the second area separation section;

a coding section which codes the areas by combining a code indicating the isolated column with a code indicating the number of columns of an area adjacent to the isolated column when the areas separated in the first to third area separation sections are coded as elements; and an output section outputting the compressed image data which have been coded by the coding section, and the image decoder comprising:

a receiving section receiving the compressed image data;

a first decoding section which decodes a code contained in the compressed image data to be a coded area coincident with a corresponding coded pattern;

a second decoding section which decodes the data to be an isolated column and an area adjacent to the isolated column based on a code indicating inclusion of the isolated column among codes contained in the compressed image data;

a third decoding section which identifies a noncoded area in the compressed image data; and a synthesizing section which obtains pixel arrays by logical line units while the areas obtained in the first to third steps are used as elements, and synthesizes the pixel arrays obtained by the logical lines to obtain bit map data.

24. A printer decoding a compressed image data which have been received from an image compression device, the image compression device comprising:

a first area separation section which scans bit map data indicating an image by an array of pixels of main scanning and subscanning directions in the main scanning direction to separate the data into an area including a black pixel and an area including no black pixel by units of a predetermined number of lines;

a second area separation section which scans the area including the black pixel which has been separated in the first area separation section in the subscanning direction to separate the area into a coded area coincident with a predetermined coded pattern and a noncoded area noncoincident with the coded pattern;

a third area separation section which separates an isolated column coincident with a predetermined isolated pattern from the noncoded area separated in the second area separation section;

a coding section which codes the areas by combining a code indicating the isolated column with a code indicating the number of columns of an area adjacent to the isolated column when the areas separated in the first to third area separation sections are coded as elements; and an output section outputting the compressed image data which have been coded by the coding section, and the printer comprising:

a receiving section receiving the compressed image data;

a first decoding section which decodes a code contained in the compressed image data to be a coded area coincident with a corresponding coded pattern;

a second decoding section which decodes the data to be an isolated column and an area adjacent to the isolated column based on a code indicating inclusion of the isolated column among codes contained in the compressed image data;

a third decoding section which identifies a noncoded area in the compressed image data;

a synthesizing section which obtains pixel arrays by logical line units while the areas obtained in the first to third steps are used as elements, and synthesizes the pixel arrays obtained by the logical lines to obtain bit map data; and a printing section which prints and outputs the image based on the bit map data.

25. A computer-readable storage medium which stores an image decoding program, for causing a computer to execute having an image compression program of instructions executable by the computer to perform a method comprising:

a command receiving step of receiving a decompression command of image data compressed by the image compression method, wherein the image compression method includes, a main scanning step of scanning bit map data which indicates an image by an array of pixels of main scanning and subscanning directions in the main scanning direction, a first area separation step of separating the data into an area including a black pixel and an area including no black pixel by units of a predetermined number of logical lines based on a result of the main scanning, a subscanning step of scanning the area including the black pixel which has been separated in the first area separation step in the subscanning direction, a second area separation step of separating the data into a coded area coincident with a predetermined coded pattern and a noncoded area noncoincident with the coded pattern, a third area separation step of separating an isolated column coincident with a predetermined isolated pattern from the noncoded area separated in the second area separation step, and a coding step of coding the areas by combining a code indicating the isolated column with a code indicating the number of columns of an area adjacent to the isolated column when the areas separated in the first to third area separation steps are coded as elements;

a first decoding step of decoding a code contained in the compressed image data to be a coded area coincident with a corresponding coded pattern;

a second decoding step of decoding the data to be an isolated column and an area adjacent to the isolated column based on a code indicating inclusion of the isolated column among codes contained in the compressed image data;

a third decoding step of identifying a noncoded area in the compressed image data; and a synthesizing step of obtaining pixel arrays by logical line units while the areas obtained in the first to third steps are used as elements, and synthesizing the pixel arrays obtained by the logical lines to obtain bit map data.

* * * * *